Nov. 1, 1960
B. L. HAVENS
2,958,465
ELECTRONIC ADDER
Original Filed Sept. 3, 1948
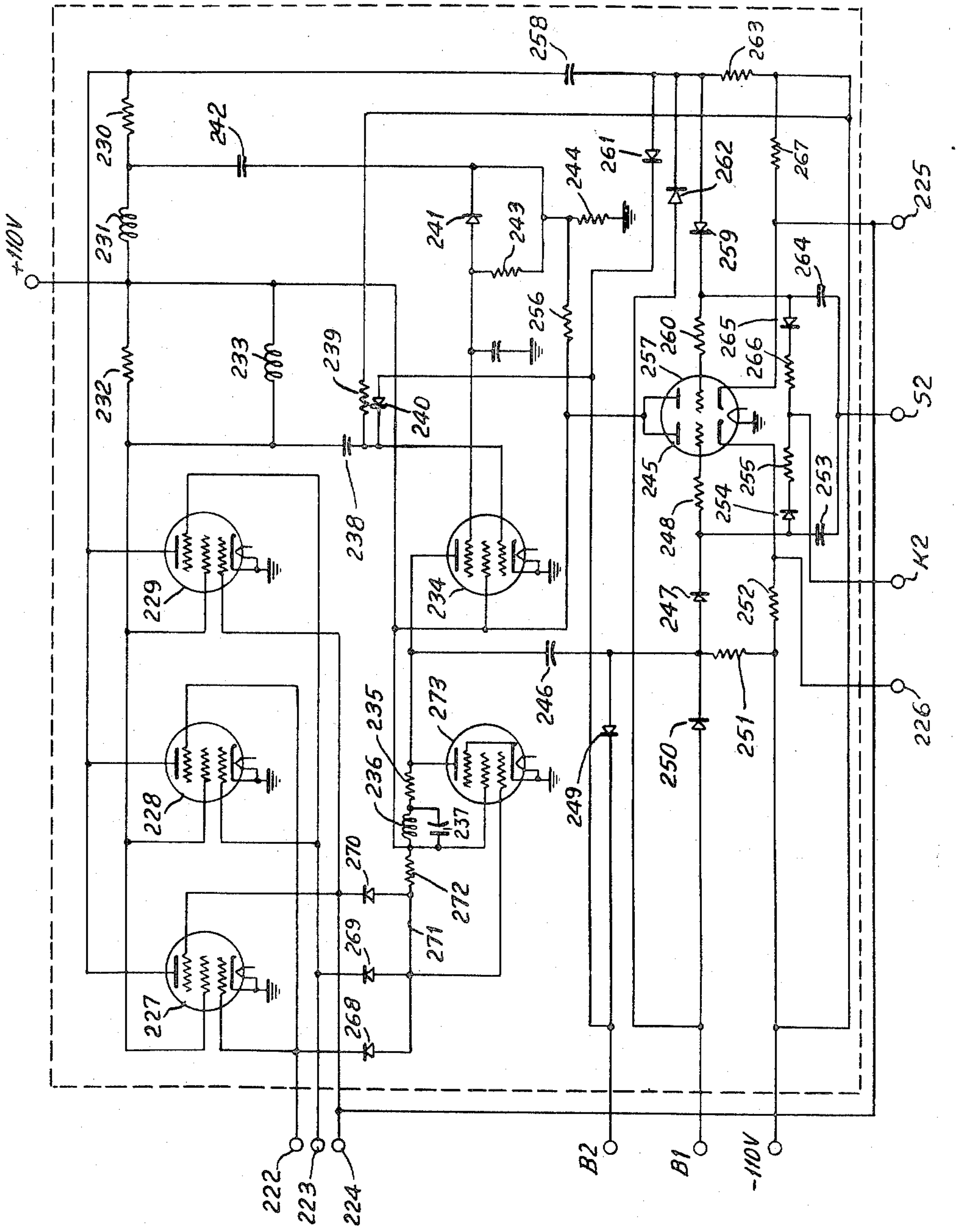
INVENTOR.
BYRON L. HAVENS
BY Albert R. Hodges
ATTORNEY United States Patent Office 2,958,465

Patented Nov. 1, 1960

2,958,465

ELECTRONIC ADDER

Byron L. Havens, Closter, N.J., assignor to International Business Machines Corporation, New York, N.Y., a corporation of New York Continuation of application Ser. No. 262,731, Dec. 21, 1951, which is a division of application Ser. No. 47,626, Sept. 3, 1948, now Patent No. 2,672,283, dated Mar. 16, 1954. This application July 22, 1957, Ser. No. 673,207

24 Claims. (Cl. 235—176)

This application is a continuation of application Serial No. 262,731 filed December 21, 1951, now abandoned, which is a division of application Serial No. 47,626 filed September 3, 1948, now Patent 2,672,283 issued March 16, 1954, which invention relates to a computing device and more particularly to a device for computing the product of two quantities. The present invention is concerned with adding circuits which are of particular utility in connection with devices for computing the product of two quantities.

A principal object of the present invention is the provision of improved adding circuits especially adapted for, but not limited to, use in an electronic multiplier of the type disclosed and claimed in the above-mentioned parent patent.

Another object is to provide a novel electronic circuit arrangement for adding two binary numbers supplied thereto in time-coded impulse form.

A further object of the present invention is the provision of a novel coincidence circuit arrangement which is especially adapted for use in binary adders.

Still another object is to provide a novel adding circuit which achieves a column shift of one column of the sum and hence is especially adapted for use in a chain for adding a plurality of partial products in an electronic multiplier.

An additional object of the present invention is the provision, in a binary adder, of means for producing a predetermined delay between the input and output pulses.

The relation of the adding circuits of the present invention to the electronic multiplier disclosed and claimed in the above-mentioned parent patent will be apparent from the following brief summary. One of the two quantities to be multiplied, that is the multiplicand, is translated into time coded, voltage impulse form and supplied simultaneously to a plurality of coincidence circuits corresponding to the different digital positions in the multiplier, each coincidence circuit being responsive to the digit in the multiplier in the corresponding digital position. Then, through the action of the coincidence circuits, all of the digits of the multiplicand are multiplied by each digit of the multiplier individually with each resulting partial product appearing in coded impulse form in the output of the corresponding coincidence circuit, each digit of the multiplicand being simultaneously and individually multiplied by every digit of the multiplier. The partial products thus obtained are then applied to a series chain of adding circuits, known as adding boxes, at different points on the chain corresponding to the proper columnar position of the partial products for adding. The resulting sum represents the product of the multiplicand and the multiplier in time coded impulse form which may be translated into another form for recording purposes.

In the time code contemplated for use in connection with the present invention, a particular period of time is assigned to each digital position in the binary number to be represented. The time base necessary in setting up the code is established by the starting impulse from the synchronizer which, in the particular device illustrated, is repeated at periodic intervals. The time immediately following a starting impulse includes a plurality of time periods of equal length, each time period corresponding to a digital position in the binary number. The first time period following a starting impulse corresponds to the first digital position from the right end of the binary number; the second time period corresponds to the second digital position from the right end of the number; and so on through all of the time periods. If a voltage impulse occurs in any time period it represents a binary 1 at the corresponding digital position in the binary number. A binary 0 at any digital position is represented by the absence of a voltage impulse in the corresponding time period.

Other objects and novel features of the invention are pointed out in the following description and claims and illustrated in the accompanying drawings, which disclose, by way of example, the principle of the invention and the best mode, which has been contemplated, of applying that principle.

The single figure of the drawing is a detailed circuit diagram of an individual adding box in accordance with the present invention.

The adding box is provided with three input terminals 222, 223 and 224 and two output terminals 225 and 226, one of the latter being a carry output terminal 225 which is connected externally to the third input terminal 224. The first input terminal 222 is to be connected to the corresponding coincidence circuit through one of lines **221*ab* (1—8**) in Figs. 2*h* and 2*j* of the above-identified parent application. The second input terminal 223 is to be connected to the output terminal 226 of the preceding adding box in the chain (if present). The output terminal 226 is to deliver the sum of the two numbers added.

Inasmuch as the two binary numbers to be supplied to an adding box in accordance with the present invention are in time coded impulse form, it is evident that only one digit of each number can be supplied to the adding box at any instant. Addition is then performed in a column-by-column manner and, according to the code, successive columns are one microsecond apart in time. There is also incorporated in the adding box a delay of exactly one microsecond between the input and the output terminals. This delay causes a carry output impulse, resulting from the addition of one column, to appear at the carry output terminal 225, and therefore at the third input terminal 224, at exactly the same time as the input impulse representations of the next column appear at the first and second input terminals 222 and 223. In addition, the one microsecond delay between the input and the other output terminal 226 causes, in effect, a column shift of one column of the sum. This is necessary for adding that sum to the next partial product in the next adding box in the chain.

The operation of the adding box is based on the fact that in adding two binary numbers manifested in time coded impulses together, column by column, only four possible conditions can be encountered by the adding box, viz: (1) no input pulses, (2) a single input impulse, (3) two simultaneous input impulses, and (4) three simultaneous input impulses. The manner in which the first condition might arise is, of course, obvious. The second condition may arise upon the adding box receiving a single impulse representing a binary 1 in the column being added in one of the two numbers being added, or an impulse representing a binary 1 carry over from the addition of the previous column. The third condition may arise upon the adding box receiving simultaneously a single input impulse representing a binary 1 in the column being added in one of the two numbers being added, and another impulse representing either a binary 1 in the column being added of the other number or a binary 1 carry. The fourth condition may arise upon the adding box receiving simultaneourly two impulses representing a binary 1 in both of the numbers being added and a third impulse representing a binary 1 carry.

The three input terminals 222, 223 and 224 of the adding box in accordance with the present invention feed three coincidence tubes 227, 228 and 229, which are preferably pentodes, such as Western Electric 6AS6 tubes. The anodes of the three coincidence tubes 227, 228 and 229 are connected through a resistor 230 and an inductor 231 to the +110 volts supply line, while the cathodes are grounded. The screen grids of the three coincidence tubes are connected together and through a resistor 232 and an inductor 233 in parallel therewith to the +110 volts supply line. The suppressor and control grids of the three coincidence tubes are interconnected in a symmetrical pattern with the three input terminals 222, 223 and 224. The first input terminal 222 is connected to the control grid of the first tube 227 and the suppressor grid of the second tube 228. The second input terminal 223 is connected to the control grid of the second tube 228 and the suppressor grid of the third tube 229. The third input terminal 224 is connected to the suppresser grid of the first tube 227 and the control grid of the third tube 229. Normally, these grids are biased by the voltage levels of the input feeds so that the three tubes 227, 228 and 229 are completely cut off when there are no impulses on any of the input terminals 222, 223 and 224. The arrangement is such that a positive impulse appearing only on the control grid of a coincidence tube causes a high screen grid current and results in a negative voltage impulse at the screen grid. A positive impulse only on the suppressor grid of a coincidence tube does not affect that tube at all. A positive impulse appearing simultaneously on both the control grid and the suppressor grid of a coincidence tube results in a negative voltage impulse at the anode as well as a negative voltage impulse at the screen grid. When negative voltage impulses appear at both the anode and the screen grid of one of the coincidence tubes, the reduction in the magnitude of the screen grid impulse which tends to result from the simultaneous presence of the anode pulse is offset by the fact that more than one of the coincidence tubes 227, 228 and 229 is, under these conditions, providing a screen grid impulse.

The screen grid circuit for the three coincidence tubes 227, 228 and 229 drives the control grid of another pentode 234, such as a Western Electric 6AS6 tube, through an impulse inverter circuit. The anode of the pentode 234 is connected through a resistor 235 and an inductor 236 to the +110 volts supply line. The cathode of the pentode 234 is grounded and the screen grid is connected to the +110 volts supply line. The control grid of the pentode 234 is coupled through a condenser 238 to the screen grids of the three coincidence tubes 227, 228 and 229. The control grid of the pentode 234 is also connected through a resistor 239 to the —110 volts supply line and through a diode 240, preferably a germanium crystal diode, to the biasing voltage line B2, with the diode offering its lower impedance to current flow from the biasing line B2. The D.C. bias on line B2 may be supplied from a conventional D.C. source and may have a valve in the order of minus six volts. This arrangement is such that the rest voltage of the control grid of the pentode 234 is that of biasing B2 which is sufficiently negative to maintain the pentode below cutoff.

When a negative voltage impulse appears at the screen grid of one or more of the three coincidence tubes 227, 228 and 229, the coupling condenser 238, which had previously been charged to the voltage difference between the +110 volts and the B2 biasing line, loses charge because the terminal thereof which is connected to the control grid of the pentode 234 is prevented by the arrangement of diode 240 from going more negative than the voltage of biasing line B2. However, as the negative voltage impulse on the screen grid of a coincidence tube is terminated, the voltage thereof rises and because of the condenser coupling a positive impulse is passed through to the control grid of the pentode 234. The upper limit of the positive voltage on the control grid of the pentode 234 under these conditions is determined by the flow of grid current through the pentode 234 when the grid reaches approximately the voltage of the cathode. Following the positive impulse, the control grid of the pentode 234 is caused to return to its rest voltage by the combination of an overshoot of the screen grid circuit, and the action of the resistor 239 connected to the —110 volts supply line, which tends to lower the grid voltage to at least the level of biasing line B2.

The suppressor grid of the pentode 234 is connected through another diode 241, also preferably a germanium crystal diode, and a condenser 242 to the junction point between the inductor 231 and the resistor 230 in the anode circuit for the three coincidence tubes 227, 228 and 229. A resistor 243 is connected in parallel with the diode 241 which offers its lower impedance to current flow from the suppressor grid. The junction between the diode 241 and the condenser 242 is connected to a junction between a resistor 256 and another resistor 244 which are in series from the +110 volts line to the ground. Thus, the suppressor grid is normally held at a voltage slightly more positive than the cathode.

If the suppressor grid of the pentode 234 is at, or more positive than, the voltage of the cathode, the presence of a positive voltage impulse at the control grid of the pentode 234 resulting from the termination of a negative voltage impulse at the screen grids of the coincidence tubes 227, 228 and 229, causes the pentode 234 to become conductive and a negative voltage impulse to appear at its anode.

The anode of the pentode 234 is coupled through a pulse inverter and synchronous delay circuit to the grid of a triode 245 connected in a cathode follower circuit. This pulse inverting and synchronous delay circuit is exactly like the one shown and described in connection with each stage of the electronic commutator in Figs. 2*e* and 2*f* of the above-identified parent application, which forms the subject matter of a divisional application, now Patent 2,903,579 issued September 8, 1959 and entitled, "Pulse Delay Apparatus," with the exception that the resistor for eliminating parasitic oscillations is placed in the grid circuit instead of in the anode circuit of the triode 245. Preferably the triode 245 is one-half of a twin triode, such as a Western Electric 2C51 tube. The operation of the pulse inverting and delay circuit in accordance with the present invention is substantially the same as that in Figs. 2*e* and 2*f* of the above-identified parent application. Briefly, this impulse producing means or circuit tends to produce an output pulse periodically but is effective actually to produce an output pulse only at a pulse period immediately following an application thereto of a signal.

In the pulse inverting and synchronous delay circuit of the present invention, the anode of the pentode 234 is connected through a coupling condenser 246, a first diode 247, and a resistor 248 to the grid of the triode 245. The first diode 247 offers its lower impedance to current flow toward the grid. The terminal of the coupling condenser 246 remote from the anode of the pentode 234 is connected through a second diode 249 to the biasing voltage line B2 with the diode 249 offering its lower impedance to current flow toward the biasing line B2. The same terminal of the coupling condenser 246 is connected through a third diode 250 to the biasing voltage line B1 with the third diode 250 offering its lower impedance to current flow away from the biasing line B1. Biasing line B1 may be supplied with a constant D.C. voltage in the order of —27 volts from a conventional D.C. voltage source (not shown). The same terminal of the coupling condenser 246 is also connected through a resistor 251 to the −110 volts supply line, the latter also being connected through a load resistor 252 to the cathode of the triode 245. The junction point between the first diode 247 and the resistor 248 is connected through a coupling condenser 253 to a synchronous voltage impulse line S2. The same junction point is also connected through a fourth diode 254 and a resistor 255 to a clamp voltage impulse line K2. The output terminal 226 for the adding box is connected to the cathode of the triode 245 while the anode thereof is connected to the +100 volts supply line. The first, second, third and fourth diodes 247, 249, 250 and 254 are all preferably germanium crystal diodes.

A voltage impulse is supplied to the adding box over the synchronous impulse line S2 once each microsecond. This is a positive, rectangular, low impedance, synchronous voltage impulse which may be supplied from a known pulse generator such as that described for instance in the above mentioned Patent 2,672,283, and particularly in connection with Figure 2*g* of that patent. This synchronous impulse is arranged to be approximately one third of a microsecond in duration. A negative voltage impulse is supplied to the adding box over the clamp impulse line K2 from the synchronizer once each microsecond as explained hereinafter, and coincides with the termination of the synchronous impulse on line S2. This is a negative voltage impulse having a steep wave front which may be supplied from a known pulse generator such as that shown and described in connection with Figure 2*g* of the above mentioned Patent 2,672,283. This is a very narrow negative voltage impulse of relatively large amplitude which occurs precisely at the end of each synchronous impulse on line S2. Between successive K2 negative impulses, the "rest" potential of the clamp line K2 is just a few volts above ground potential.

Let it be assumed that the grid of triode 245 is at the potential of line B1 with condenser 253 charged to the difference between line B1 and the normal voltage of synchronous line S2. Because of the connection of the −110 volts line through the resistor 251 to the junction between the coupling condenser 246 and the first diode 247, that junction tends to be highly negative but is limited to the voltage of biasing line B1 by the third diode 250. The grid of triode 245 is also prevented from becoming more negative than biasing line B1 by the third and first diodes 250 and 247. Now when a negative voltage impulse appears at the anode of the pentode 234, the coupling condenser 246 which has been previously charged to the voltage difference between the +110 volts and the biasing line B1, is discharged. However, during this discharge the terminal of the condenser 246 remote from the anode of the pentode 234 is maintained substantially at the voltage of line B1 because of its connection thereto through the third diode 250. As the negative anode impulse at the pentode 234 ends, a positive impulse is passed through the coupling condenser 246 and the first diode 247 to the grid of the triode 245 and to condenser 253. The magnitude of this positive impulse is limited by the arrangement of the second diode 249, to the difference between the voltages of biasing lines B1 and B2. This positive impulse changes the charge on the condenser 253 coupling the grid of the triode 245 to the synchronous impulse line S2, so that even after the positive impulse is terminated, the grid remains at the voltage of biasing line B2.

The purpose of the first diode 247 is to permit the voltage of the terminal of the coupling condenser 246 remote from the anode of the pentode 234 to return to the voltage level of line B1 without changing the voltage of the grid of the triode 245. Such return of the voltage of the condenser terminal is effected by an overshoot of the anode impulse of the pentode 234 and the action of the resistor 251 connecting the terminal to the −110 volts supply line.

It is then evident that while the pentode 234 remains non-conductive, the grid of triode 245 remains at the negative voltage level of biasing line B1. While the grid is at this level, the application of a synchronous impulse thereto does not produce a sufficient impulse output of the triode 245 to actuate any of the tubes to be supplied therefrom. On the other hand, when the pentode 234 becomes conductive and then non-conductive, a voltage pedestal of the level of line B2 is established on the grid of the triode 245. With the grid at the level of line B2, a synchronous impulse produces an effective impulse at the triode output. Since the pentode 234 becomes conductive as a result of the coincidence tube or tubes becoming non-conductive following receipt of an impulse, and the voltage pedestal at the grid of triode 245 is established as a result of the pentode 234 becoming non-conductive, it is apparent that the synchronous impulse producing the output impulse is that synchronous impulse which occurs at the next time period after the time period in which the input impulse to the adding box originally occurred. Thus, the output impulse occurs one microsecond after the input impulse.

As the synchronous impulse ends, the negative clamping impulse having a steep wave front is supplied over line K2 causing the grid of the triode 245 to be lowered to the voltage level of line B1. The fourth diode 254 and the resistor 255 in series therewith serve to isolate the clamping supply line K2. The constants of the load circuit of the pentode 234 are selected to provide the desired shape for the voltage pedestal.

It now appears that when a negative voltage impulse appears at the screen grids of the three coincidence tubes 227, 228 and 229 and the suppressor grid of the pentode 234 remains at or above the voltage of its cathode, a positive voltage impulse is delivered to the output terminal 226 of the adding box exactly one microsecond after the input impulses which caused the screen grid impulse.

While the suppressor grid of the pentode 234 is normally slightly positive with respect to its cathode, the presence of a negative impulse at the anodes of the three coincidence tubes 227, 228 and 229 causes the suppressor grid to become more negative. As previously mentioned, such a negative anode impulse at the three coincidence tubes results from the presence of two or more simultaneous impulses on the three input terminals. This negative impulse at the anodes of the coincidence tubes is transmitted to the suppressor grid of the pentode 234 through the coupling condenser 242 and the diode 241. When the suppressor grid of pentode 234 is negative, it prevents the anode of pentode 234 from becoming conductive in response to a positive impulse on the control grid.

It is to be noted that the negative impulse on the suppressor grid of pentode 234 is obtained from the inductive portion, i.e., inductor 231, of the load of the three coincidence tubes. This arrangement is used to prevent undesirable changes in the average voltage of the suppressor grid which would result if condenser 242 were connected directly to the anodes of the coincidence tubes. The positive impulses on the control grid of the pentode 234 resulting from a negative impulse at the screen grids of the coincidence tubes is delayed somewhat since the positive impulse is the result of the termination rather than the initiation of the negative screen grid impulse at the coincidence tubes. However, by having the negative impulse on the suppressor grid of the pentode 234 supplied directly by the anode circuit of the coincidence tubes and by having the voltage of the suppressor grid returned to its rest or normal value more slowly than the lower terminal of the coupling condenser 242 because of the arrangement of the diode 241 and resistor 243, the suppressor grid is maintained negative over a sufficient interval to insure blocking of the pentode 234 even though a positive impulse is supplied to the control grid. Thus, it is evident that when two or more impulses occur simultaneously on the input terminals 222, 223 and 224, the anode of pentode 234 is maintained non-conductive.

In adding a single column of two numbers in the binary system, a binary 1 plus a binary 0, represented by a single impulse on one of the input terminals 222, 223 and 224 of an adding box in accordance with the present invention, equals a binary 1, represented by a single impulse produced at the output terminal 226 as a result of the screen grid impulse at the coincidence tubes 227, 228 and 229 and the operation of the pentode 234 and triode 245 as previously described. However, a binary 1 plus another binary 1, as represented by two simultaneous impulses on two of the input terminals 222, 223 and 224, equals a binary 0 with a binary 1 being carried over to the next column. Consequently, there should not be an impulse on the output terminal 226 in this last example, but a carry impulse must be provided. Now when two or more input impulses occur simultaneously, there is produced a negative impulse at the anodes of the coincidence tubes 227, 228 and 229, as well as at their screen grids. The anode impulse is effective as just described to block the tendency of the screen grid impulse to produce an output impulse at the output terminal 226 to represent a binary 1 and the absence of an impulse at the output terminal 226 then represents a binary 0. This same anode impulse is also employed to produce the necessary carry impulse at the carry terminal 225.

The anodes of the three coincidence tubes 227, 228 and 229 are coupled to the grid of another triode 257 through another impulse producing or pulse inverting and synchronous delay circuit similar to that described between the pentode 234 and the other triode 245. This pulse inverting and delay circuit comprises a condenser 258, a first diode 259, and a resistor 260 connected in series between the anodes of the coincidence tubes 227, 228 and 229 and the grid of the triode 257. There are also included a second diode 261 connecting the terminal of the condenser 258 remote from the anodes of the coincidence tubes to the biasing voltage line B2, a third diode 262 coupling the same terminal to the biasing line B1, a resistor 263 connecting the same terminal to the −110 volts supply line, a condenser 264 coupling the grid of the triode 257 to the synchronous impulse line S2 and a fourth diode 265 and a resistor 266 connecting the grid to the clamp impulse line K2. The triode 257 may be half of a twin triode of which the triode 245 is the other half. The anode of the triode 257 is connected to the +110 volts supply line. The cathode of the triode 257 is connected through a load resistor 267 to the −110 volts supply line, and is also connected to the carry output terminal 225.

The operation of this pulse inverting and synchronous delay circuit feeding the triode 257 is exactly like that of the delay circuit feeding the triode 245, as previously described. Therefore, when a negative impulse appears at the anodes of the coincidence tubes, a positive impulse appears exactly one microsecond later at the carry output terminal 225 which is connected directly to the third input terminal 224.

It now appears that when two input impulses occur simultaneously on two of the input terminals producing a negative impulse at both the screen grids and the anodes of the coincidence tubes, an impulse is not provided at the output terminal 226 but an impulse is provided at the carry terminal 225, one microsecond later.

When an impulse occurs simultaneously on each of the three input terminals 222, 223 and 224 of the adding box, an impulse should be produced for proper addition on both the output terminal 226 and the carry terminal 225 inasmuch as a binary 1 plus a second binary 1 plus a third binary 1 equals a binary 1 with a carry of a binary 1 to the next column. It has already been pointed out that simultaneous impulses on the three input terminals causes a negative impulse at the screen grids and at the anodes of the coincidence tubes 227, 228 and 229. This produces an impulse at the carry output terminal 225 one microsecond later but the tendency of the screen grid impulse to produce an output impulse at the output terminal 226 through the pentode 234 is blocked. To provide such an output impulse under these conditions, a novel triple coincidence circuit is provided.

The triple coincidence circuit incorporates three diodes 268, 269 and 270, preferably germanium crystal diodes, connected, respectively, between the three input terminals 222, 223 and 224 and a common line 271 with the diodes offering their lower impedance to current flow toward the input terminals. The common line 271 of the three diodes 268, 269, 270 is connected through a resistor 272 to the +110 volts supply line. It is also connected to the controlling member or control grid of a work device preferably comprising another pentode 273, such as a Western Electric 6AK5 tube. The anode of the second pentode 273 is connected to the anode of the first pentode 234 and therefore is connected through the resistor 235 and the parallel connected condenser 237 and inductor 236 to the +110 volts supply line, as well as to the grid of the triode 245 through the pulse inverting and synchronous delay circuit therebetween. The cathode of the second pentode 273 is connected to the ground and to the suppressor grid, and the screen grid is connected to the +110 volts supply line.

By the arrangement described, the common line 271 of the three diodes 268, 269 and 270 can be but very little more positive than the voltage of the most negative of the input terminals 222, 223 and 224. In other words, for the common line 271 to have a positive impulse, it is necessary that all three input terminals 222, 223 and 224 have a positive impulse thereon at the same time. When this occurs, the second pentode 273 becomes conductive and passes an impulse to the triode 245 to produce in turn an impulse at the output terminal 226 one microsecond after the input pulses. It is then obvious that when input impulses are applied simultaneously to the three input terminals, the second pentode 273 acts on the first triode 245 to produce an output impulse at terminal 226 while the anode impulse of the coincidence tubes 227, 228 and 229 produces a carry impulse at terminal 225 and blocks the first pentode 234 which is responsive to screen grid impulse of the coincidence tubes.

From the foregoing description of an adding box as shown in the single figure of the drawing, it is evident that a single input impulse produces a single output impulse at terminal 226; two simultaneous input impulses produce only a carry impulse; and three simultaneous input impulses produce an output impulse at terminal 226 and a carry impulse. The output and carry impulses are delayed exactly one microsecond in all cases which is to be remembered in interpreting the time coded impulses representing the sum of the numbers added by the adding box.

While in the description of the fundamental novel features of my invention as applied to a preferred embodiment and as illustrated in the drawing, reference has been made to tubes of specific types, it will be understood that other tubes of suitable characteristics may be employed instead. It will also be understood that various other omissions, substitutions and changes in the form and details of the devices illustrated and in its operation may be made by those skilled in the art without departing from the spirit of the invention. It is the intention, therefore, to be limited only as indicated by the scope of the following claims.

What is claimed is:

1. In an electronic adding circuit, the combination comprising a plurality of input lines adapted to have input voltage impulses applied thereto individually, a pair of load circuits connected from a positive to a negative voltage supply point, electronic tube means in said load circuits for controlling current therethrough and connected to said input lines to be responsive to an input impulse on any one of said lines to cause a current impulse in the first of said load circuits and responsive to two simultaneous impulses on any two lines to cause a current impulse in the second load circuit, the first load circuit including a resistor connected from said positive point to said tube means and the second load circuit including an inductor and a resistor connected in series in the order named from said positive point to the tube means, a pair of pulse circuits for producing output pulses responsive to individual signal impulses, a control tube coupled to the first of said pulse circuits to supply a signal impulse thereto upon a current impulse through the control tube, said tube having two grids controlling the conductivity thereof, a voltage impulse inverting circuit connecting one of said grids to the first load circuit intermediate the resistor therein and the tube means and effective to maintain said control tube normally non-conductive but responsive to the decay of a voltage impulse appearing at its point of connection to the first load circuit to apply a voltage impulse of opposite polarity to said one grid to cause a current impulse through the control tube, said second pulse circuit being coupled to said second load circuit intermediate the resistor thereof and the tube means to receive a signal impulse upon the occurrence of a current impulse through the second load circuit, a rectifier and a resistor connected in parallel with each other and in series with a coupling condenser in the order named from the other grid to said second load circuit intermediate the resistor and inductor therein, and another resistor connecting a point intermediate the rectifier and condenser to a source of voltage normally maintaining said other grid at a voltage permitting said inverted impulse at said one grid to render the control tube conductive, whereby a current impulse through said second load circuit causes a voltage impulse on the other grid to prevent a simultaneous current impulse through said first circuit for causing the control tube to become conductive.

2. Apparatus according to claim 1 in which the impulse inverting circuit comprises resistive means connecting said one grid to a source of voltage more negative than said positive point, a rectifier connecting said one grid to another source of voltage of a value intermediate said first source and said positive point, said rectifier offering its lower impedance to current flow toward said one grid, and a condenser connected between said one grid and the first load circuit intermediate the resistor therein and the tube means.

3. An adding circuit comprising three input lines adapted to have input voltage impulses applied thereto individually; three electronic tubes, each having an anode, a cathode and at least three grids, with one of the grids of one tube connected to the corresponding grid of both of the other tubes and the two remaining grids of each tube connected to two different ones of said input lines with corresponding ones of said two remaining grids being connected to different ones of the input lines; means connecting all of said anodes together and all of said cathodes together in a common main load circuit; means connecting said interconnected one grids and cathodes in a common auxiliary load circuit, each of said tubes being normally non-conductive and responsive to an input impulse on one of the lines to which its grids are connected to cause a current impulse in said auxiliary load circuit and responsive to simultaneous input impulses on both of the lines to which its grids are connected to cause a current impulse in both said main and auxiliary load circuits, first and second output terminals; an impulse producing circuit connected to each output terminal and effective to provide an output impulse at a preselected instant following an application thereto of an initiating signal; coupling means connecting said auxiliary load circuit to the first of said impulse producing circuits and responsive to a current impulse through the former to supply a signal to the latter; said main load circuit being coupled to the second impulse producing circuit to supply a signal thereto upon a current impulse through the main load circuit; means connecting said main load circuit to said coupling means and responsive to a current impulse in the main load circuit to prevent the supply of a signal from said auxiliary load circuit to said first impulse producing circuit; and coincidence means connected to said input lines and responsive to simultaneous input impulses on all of said lines to supply a signal to said first impulse producing circuit.

4. An adding circuit comprising three input lines, two of which are adapted to have applied thereto individually, at spaced index points in time, coded voltage input impulses representing in the binary system two numbers to be added with successive index points corresponding to successive increasing orders; an output terminal; a carry terminal connected to the third input line to transfer thereto impulses appearing at the carry terminal; three electronic tubes, each having an anode, a cathode and at least three grids, with one of the grids of one tube connected to the corresponding grid of both of the other tubes and the two remaining grids of each tube connected to two different ones of said input lines with corresponding ones of said two remaining grids being connected to different ones of the input lines; means connecting all of said anodes together and all of said cathodes together in a common main load circuit; means connecting said interconnected one grids and cathodes in a common auxiliary load circuit, each of said tubes being normally non-conductive and responsive to an input impulse on one of the lines to which its grids are connected to cause a current impulse in said auxiliary load circuit and responsive to simultaneous input impulses on both of the lines to which its grids are connected to cause a current impulse in both said main and auxiliary load circuits; first impulsing means connected to the output terminal and actuatable in response to a current impulse in said auxiliary load circuit to provide an impulse at the output terminal at the next index point time; second impulsing means connected to the carry terminal and actuatable in response to a current impulse in said main load circuit to provide an impulse at the carry terminal at the next index point time; means responsive to a current impulse in said main load circuit to prevent actuation of the first impulsing means in response to a simultaneous current impulse in the auxiliary load circuit; and coincidence means connected to said input lines and responsive to simultaneous impulses on all three lines to actuate the first impulsing means to produce an impulse at the output terminal at the next index point time.

5. An adding circuit comprising three input lines, two of which are adapted to have applied thereto individually, at spaced index points in time, coded voltage input impulses representing in the binary system two numbers to be added with successive index points corresponding to successive increasing orders; a pair of electronic tubes having individual load circuits; an output terminal connected to the load circuit of the first tube; a carry terminal connected to the second tube load circuit and also to the third input line to transfer thereto impulses appearing at the carry terminal; control means for each of said tubes including synchronizing means tending to cause the tube to supply an output impulse to the corresponding terminal at each index point time but actually effective to cause such output impulse only when conditioned subsequent to the preceding index point time; means connected to said input lines and responsive to an impulse on any one of said lines to condition the first tube control means subsequently thereto but prior to the next index point time and responsive to simultaneous impulses on any two of said lines to condition only the second tube control means subsequently thereto but prior to the next index point time; and coincidence means connected to said input lines and responsive to simultaneous impulses on all three lines to condition the first tube control means subsequently thereto but prior to the next index point time.

6. An adding circuit comprising at least three input lines adapted to have input voltage implulses applied thereto individually, first and second output terminals, an impulse producing circuit connected to each output terminal and effective to provide an ontput impulse at a preselected instant following an application thereto of a signal, means connected to said input lines and responsive to an input impulse on any one thereof to apply a signal only to the first of the impulse producing circuits and responsive to simultaneous input impulses on any two input lines to apply a signal only to the second of the impulse producing circuits, and coincidence circuit means connected to said input lines and responsive to simultaneous input impulses on all of said input lines to apply a signal to the first impulse producing circuit, said coincidence circuit means comprising a device connected to said first impulse producing circuit and having a control member, means connected to said control member tending to cause it to be at a predetermined voltage, said device providing a signal to said first impulse producing circuit only upon said member changing from said predetermined voltage, and a rectifier for each input line connected between that line and said member with all of the rectifiers arranged to conduct current in the same direction relative to said member.

7. An adding circuit comprising at least three input lines adapted to be normally at a first voltage level and to have input voltage impulses applied thereto individually, means connected to said input lines and responsive to an input impulse on any one of said lines to provide a corresponding impulse at a first point and responsive to simultaneous input impulses on any two input lines to provide a corresponding impulse at a second point, first and second output terminals, an impulse producing circuit connected to each output terminal and effective to provide an output impulse at a preselected instant following an application thereto of a signal impulse, said second point being coupled to the second impulse producing circuit whereby a signal impulse is applied to the latter upon the appearance of an impulse at the former, an electronic tube connected in a load circuit to effect the application of a signal impulse to the first impulse producing circuit upon a current impulse in said load circuit, first control means for said tube normally maintaining it in one condition with respect to conductivity, said first control means being connected to said first point and responsive to an impulse thereon to change momentarily the condition of said tube to cause a current impulse in said load circuit, second control means for said tube connected to said second point and responsive to an impulse thereon to prevent a simultaneous impulse at the first point from effecting a change in the condition of the tube, and coincidence circuit means connected to said input lines and responsive to simultaneous input impulses on all of said lines to supply a signal impulse to said first impulse producing circuit, said coincidence circuit means comprising a second electronic tube, an output circuit for said second tube connected to said first impulse producing circuit, said second tube having an electrode controlling output current therethrough in accordance with the voltage of said electrode, an impedance member connecting the electrode to a source of second voltage different from said first voltage and with the same polarity relative thereto as said input impulse, whereby the electrode tends to be at said second voltage, and a rectifier for each input line connected between that line and said electrode and arranged to conduct current toward the normally more negative one of said second voltage and that line, whereby the electrode is maintained at said first voltage except when all of said input lines have an impulse thereon.

8. An adding circuit having a plurality of input terminals, comprising: a multi-electrode electron discharge device associated with each said terminal, means comprising first electrodes of each of said devices for developing a first output signal when input signals are applied to two or more of said terminals, means comprising second electrodes of each of said devices for developing a second output signal when input signals are applied to one or more of said terminals, means for developing a third output signal when input signals are applied to three of said terminals, means for utilizing said first output signal to control said second output signal, and means for combining said controlled output signal and said third output signal to provide an adding circuit output signal.

9. An adding circuit having a plurality of input terminals, comprising: a multi-electrode electron discharge device associated with each said terminal; means comprising first electrodes of each of said devices for developing a first output signal when input signals are applied to two or more of said terminals; means comprising second electrodes of each of said devices for developing a second output signal when input signals are applied to one or more of said terminals; means for developing a third output signal when input signals are applied to all of said terminals, said means comprising plural rectifier elements; means for utilizing said first output signal to control said second output signal; and means for combining said controlled output signal and said third output signal to provide an adding circuit output signal.

10. An adding circuit having a plurality of input terminals, comprising: a multi-electrode electron discharge device associated with each said terminal; means comprising first electrodes of each of said devices for developing a first output signal when input signals are applied to two or more of said terminals; means comprising second electrodes of each of said devices for developing a second output signal when input signals are applied to one or more of said terminals; means for developing a third output signal when input signals are applied to all of said terminals; means for utilizing said first output signal to control said second output signal, said means comprising an electron discharge device having a control electrode and rectifier means for applying said first output signal to said last-mentioned control electrode; and means for combining said controlled output signal and said third output signal to provide an adding circuit output signal.

11. An adding circuit having a plurality of input terminals, comprising: a multi-electrode electron discharge device associated with each said terminal, means comprising first electrodes of each of said devices for developing a first output signal when input signals are applied to two or more of said terminals, means comprising second electrodes of each of said devices for developing a second output signal when input signals are applied to one or more of said terminals, means comprising a first electron discharge device for developing a third output signal when input signals are applied to all of said terminals, means comprising a second electron discharge device for utilizing said first output signal to control said second output signal, and means for combining said controlled output signal and said third output signal to provide an adding circuit output signal, said combining means comprising a load impedance common to said first and second electron discharge devices.

12. An adding circuit comprising three input lines, two of which are adapted to have applied thereto individually, at spaced index points in time, coded voltage input impulses representing in the binary system two numbers to be added with successive index points corresponding to successive increasing orders; an output terminal; a carry terminal connected to the third input line to transfer thereto impulses appearing at the carry terminal; a first impulse producing circuit connected to the output terminal; a second impulse producing circuit connected to the carry terminal, each of said impulse producing circuits being effective to provide an impulse at the corresponding terminal at the next index point time following an application thereto of a signal; means connected to said input lines and responsive to an impulse on any one thereof to apply a signal to the first impulse producing circuit and responsive to simultaneous impulses on any two input lines to apply a signal only to the second impulse producing circuit; and coincidence circuit means connected to said input lines and responsive to simultaneous impulses on all three lines to apply a signal to the first impulse producing circuit.

13. An adding circuit comprising three input lines, two of which are adapted to have applied thereto individually, at spaced index points in time, coded voltage input impulses representing in the binary system two numbers to be added with successive index points corresponding to successive increasing orders; an output terminal; a carry terminal connected to the third input line to transfer thereto impulses appearing at the carry terminal; means connected to said input lines and responsive to an impulse on any one of said lines to provide an impulse at a first circuit point and responsive to simultaneous impulses on any two of said lines to provide an impulse at a second circuit point; first impulse producing means actuatable in response to an impulse at said first circuit point to produce an impulse at the output terminal at the next index point time; means responsive to an impulse at said second circuit point to prevent actuation of said first impulse producing means in response to a simultaneous impulse at said first circuit point; second impulse producing means responsive to an impulse at said second circuit point to produce an impulse at the carry terminal at the next index point time; and coincidence circuit means connected to said input lines and responsive to simultaneous impulses on all three lines to actuate said first impu'se producing means to produce an impulse at the output terminal at the next index point time.

14. A binary full adder including sum circuit means for providing a binary sum output at a first terminal, carry circuit means for providing a binary carry output at a second terminal, input means for receiving three binary inputs to be added in binary fashion, an OR circuit connected to said input means and to said sum circuit means to exhibit manifestations at said first terminal corresponding to receipt of one signal only on said inputs, an inhibiting circuit cooperating with said OR circuit and preventing a manifestation at said first terminal upon receipt of two inputs only, means cooperating with said OR circuit to produce a manifestation on said second terminal upon receipt of at least two inputs, and means comprising a separate coincidence circuit connected to said sum circuit means for producing a manifestation on said first terminal upon receipt of three inputs.

15. An adding circuit comprising at least three input lines adapted to have input voltage impulses applied thereto individually, first and second output terminals, an inpulse producing circuit connected to each output terminal and effective to provide an output impulse at a preselected instant following an application thereto of a signal, means connected to said input lines and responsive to an input impulse on any one thereof to apply a signal only to the first of the impulse producing circuits and responsive to simultaneous input impulses on any two input lines to apply a signal only to the second of the impulse producing circuits, and coincidence circuit means connected to said input lines and responsive to simultaneous input impulses on all of said input lines to apply a signal to the first impulse producing circuit.

16. An adding circuit comprising at least three input lines adapted to have input voltage impulses applied thereto individually, means connected to said input lines and responsive to an input impulse on any one of said lines to provide a corresponding impulse at a first point and responsive to simultaneous input impulses on any two input lines to provide a corresponding impulse at a second point, first and second output terminals, an impulse producing circuit connected to each output terminal and effective to provide an output impulse at a preselected instant following an application thereto of a signal impulse, coupling means connecting said first point to the first of said impulse producing circuits and responsive to an impulse at the former to apply a signal impulse to the latter, said second point being coupled to the second impulse producing circuit whereby a signal impulse is applied to the latter upon the appearance of an impulse at the former, means connected to said coupling means and responsive to an impulse at said second point to prevent the application of a signal impulse to the first impulse producing circuit by reason of a simultaneous impulse at said first point, and coincidence circuit means connected to said input lines and responsive to simultaneous input impulses on all of said lines to supply a signal impulse to said first impulse producing circuit.

17. An adding circuit comprising at least three input lines adapted to have input voltage impulses applied thereto individually, means connected to said input lines and responsive to an input impulse on any one of said lines to provide a corresponding impulse at a first point and responsive to simultaneous input impulses on any two input lines to provide a corresponding impulse at a second point, first and second output terminals, an impulse producing circuit connected to each output terminal and effective to provide an output impulse at a preselected instant following an application thereto of a signal impulse, said second point being coupled to the second impulse producing circuit whereby a signal impulse is applied to the latter upon the appearance of an impulse at the former, an electronic tube connected in a load circuit to effect the application of a signal impulse to the first impulse producing circuit upon a current impulse in said load circuit, control means for said tube connected to said first and second points and responsive to an impulse at the first point to cause a current impulse in said load circuit and responsive to an impulse at the second point to prevent a current impulse in said load circuit by reason of a simultaneous first point impulse, and coincidence circuit means connected to said input lines and responsive to simultaneous input impulses on all of said lines to supply a signal impulse to said first impulse producing circuit.

18. An adding circuit comprising at least three input lines adapted to have input voltage impulses applied thereto individually, means connected to said input lines and responsive to an input impulse on any one of said lines to provide a corresponding impulse at a first point and responsive to simultaneous input impulses on any two input lines to provide a corresponding impulse at a second point, first and second output terminals, an impulse producing circuit connected to each output terminal and effective to provide an output impulse at a preselected instant following an application thereto of a signal impulse, said second point being coupled to the second impulse producing circuit whereby a signal impulse is applied to the latter upon the appearance of an impulse at the former, an electronic tube connected in a load circuit to effect the application of a signal impulse to the first impulse producing circuit upon a current impulse in said load circuit, first control means for said tube normally maintaining it in one condition with respect to conductivity, said first control means being connected to said first point and responsive to an impulse thereon to change momentarily the condition of said tube to cause a current impulse in said load circuit, second control means for said tube connected to said second point and responsive to an impulse thereon to prevent a simultaneous impulse at the first point from effecting a change in the condition of the tube, and coincidence circuit means connected to said input lines and responsive to simultaneous input impulses on all of said lines to supply a signal impulse to said first impulse producing circuit.

19. An adding circuit having a plurality of input terminals, comprising: means for developing a first output signal when input signals are applied to two or more of said terminals, means for developing a second output signal when input signals are applied to one or more of said terminals, means for developing a third output signal when input signals are applied to all of said terminals, means for utilizing said first output signal to control said second output signal, and means comprising a pulse circuit for combining said controlled second output signal and said third output signal to provide an adding circuit output signal pulse.

20. An adding circuit having a plurality of input terminals, comprising: electron discharge means for developing a first output signal at a first circuit point when input signals are applied to two or more of said terminals and for developing a second output signal at a second circuit point when input signals are applied to one or more of said terminals, means for developing a third output signal at a third circuit point when input signals are applied to all of said terminals, means connected for utilizing said first output signal to control said second output signal, and means connected for combining said controlled second output signal and said third output signal to provide an adding circuit output signal.

21. An adding circuit having a plurality of input terminals, comprising: a plurality of electron discharge devices for developing a first output signal when input signals are applied to two or more of said terminals and for developing a second output signal when input signals are applied to one or more of said terminals; means for developing a third output signal when input signals are applied to all of said terminals, said means comprising rectifier elements; means for utilizing said first output signal to control said second output signal, said means comprising an electron discharge device; and means for combining said controlled second output signal and said third output signal to provide an adding circuit output signal.

22. A circuit for effecting binary addition of three input signals comprising three input lines normally maintained at a first potential and arranged to supply pulses to be added at a second potential, separate multi-electrode electron devices respectively having control electrodes connected to said input lines; each of said devices having a suppression electrode connected to one of said input lines which is different from the input line to which its control electrode is connected, each of said devices having a main output electrode connected to a common main circuit and an auxiliary output electrode connected to a common auxiliary circuit; each of said devices providing an output at its auxiliary electrode to said auxiliary circuit upon the application of an input pulse to its control electrode; each of said devices providing an output at its main output electrode to said main circuit upon the concurrent application of input pulses to its control and suppression electrodes; a carry output device connected to said main circuit to provide a carry output in response thereto; a sum output device connected to said auxiliary circuit to provide a sum output in response thereto; an inhibit device connected between said auxiliary circuit and said sum output device and connected to receive signals from said main output circuit to inhibit the operation of said sum device in response thereto; and a coincidence circuit connected for operation in response to concurrent input signals on all three of said input lines; said coincidence circuit being connected to provide for operation of said sum output device independent of said inhibit circuit.

23. An adding circuit for effecting binary addition of a plurality of electrical input signals comprising a plurality of input lines normally maintained at a first potential value and arranged to have impressed thereon electrical pulses of a second potential value at predetermined time intervals for which addition is to take place; a multi-electrode electron device for each of said input lines, said devices each having a control electrode; said control electrodes being respectively connected to said input lines; each of said devices having a suppression electrode connected to one of said input lines which is different from the input line to which its control electrode is connected; each of said devices having a main output electrode connected in common in a main circuit; each of said devices having an auxiliary output electrode connected in common in an auxiliary circuit; each of said devices being independently operative to provide an output at its auxiliary output electrode for said auxiliary circuit upon the application of an input pulse to its control electrode irrespective of the condition of its suppression electrode; each of said devices being operative to provide an output at its main output electrode for said main circuit only upon the concurrent application of input pulses to both its control and suppression electrodes; a carry output device connected to said main circuit to provide a carry output in response thereto; a sum output device connected to said auxiliary circuit to provide a sum output in response thereto; an inhibit device connected between said auxiliary circuit and said sum output device and connected to receive signals from said main output circuit and operative to inhibit the operation of said sum device upon the concurrent presence of signals from said main and auxiliary circuits.

24. An adding circuit for effecting binary addition of three electrical input signals comprising first, second and third input lines normally maintained at a first potential value and arranged to have impressed thereon electrical pulses of a second potential value at predetermined time intervals for which addition is to take place; first, second and third multi-electrode electron devices each having a control electrode; said control electrodes being respectively connected to said first, second and third input lines; each of said devices having a suppression electrode; said suppression electrodes of said first, second and third devices being respectively connected in the order named to said third, first and second input lines; each of said devices having a main output electrode connected in common with the other main output electrodes in a main circuit; each of said devices having an auxiliary output electrode connected in common with the other auxiliary output electrodes in an auxiliary circuit; each of said devices being independently operative to provide an output at its auxiliary output electrode for said auxiliary circuit upon the application of an input pulse to its control electrode irrespective of the condition of its suppression electrode; each of said devices being operative to provide an output at its main output electrode for said main circuit only upon the concurrent application of input pulses to both its control and suppression electrodes; a carry output device connected to said main circuit to provide a carry output in response thereto; a sum output device connected to said auxiliary circuit to provide a sum output in response thereto; an inhibit device connected between said auxiliary circuit and said sum output device and connected to receive signals from said main output circuit and operative to inhibit the operation of said sum device upon the concurrent presence of signals from said main and auxiliary circuits; and a separate coincidence circuit connected for operation in response to concurrent input signals on all three of said input lines; said separate coincidence circuit being connected to provide for operation of said sum output device independent of said inhibit circuit.

References Cited in the file of this patent

UNITED STATES PATENTS

| | | |
|---|---|---|
| 2,303,968 | White | Dec. 1, 1942 |
| 2,404,250 | Rajchman | July 16, 1946 |
| 2,425,063 | Kahn et al. | Aug. 5, 1947 |
| 2,429,228 | Herbst | Oct. 21, 1947 |
| 2,434,153 | Grosdoff | Jan. 6, 1948 |
| 2,543,442 | Dench | Feb. 27, 1951 |
| 2,557,729 | Eckert | June 19, 1951 |
| 2,616,965 | Hoeppner | Nov. 4, 1952 |

OTHER REFERENCES

RCA Research Labs, Electronic Anti-Aircraft Fire Control Predictor (April 14, 1942), pps. 72–73, Fig. 3.21.

Moore School of Electrical Engineering, Progress Report #2 on the Edvac; University of Pennsylvania (June 30, 1946). Declassified Feb. 13, 1947; pps. 1—1—11 to 1—1—14A; Figs. PY–0101, 103, 104 and 177.

Burks, A. W.: Electronic Computing Circuits of the Eniac, Proceedings of the IRE, vol. 35, No. 8 (Aug. 1947), pps. 758, 763–764.

Howland et al.: Electronics for Cosmic-Ray Experiments, Review of Scientific Instruments (Aug. 1947), pps. 551–556.

University of Pennsylvania, A Functional Description of the Edvac (Nov. 1, 1949), vol. II.

Engineering Research Associates, Inc., High Speed Computing Devices (July 28, 1950), pps. 276 to 287.

Tung Chang Chen: Diode Coincidence and Mixing Circuits in Digital Computers, Proceedings of the IRE (May 1950), pages 511 to 514.